United States Patent [19]

Hreha

[11] 4,007,864
[45] Feb. 15, 1977

[54] CARRIER FOR AUTOMOBILE

[76] Inventor: Emanuel Hreha, 348 E. 27th St., Erie, Pa. 16504

[22] Filed: Mar. 5, 1975

[21] Appl. No.: 555,371

[52] U.S. Cl. .................... 224/42.46 R; 224/42.43; 211/113

[51] Int. Cl.² .................................. B60R 9/02

[58] Field of Search ... 224/29 R, 42.46 R, 42.45 R, 224/42.46 B, 42.45 B, 42.43, 42.44, 42.38, 32 R, 39 R, 30 R; 211/86, 113, 118; 248/226 R, 226 C

[56] References Cited

UNITED STATES PATENTS

| | | | |
|---|---|---|---|
| 2,302,300 | 11/1942 | Davies | 224/42.45 R |
| 3,158,302 | 11/1964 | Dickerson | 224/42.43 |
| 3,837,545 | 9/1974 | Rogers | 224/32 R |

*Primary Examiner*—Robert J. Spar
*Assistant Examiner*—Jerold M. Forsberg

[57] ABSTRACT

A support for carrying sheet-like material of a maximum of 4 feet by 8 feet on an automobile is disclosed herein. The support has a Z-shaped member that may be hooked over the door of an automobile through an open window. Two vertical rigid members are spaced from each other and connected by an intermediate member. This assembly is attached to the above mentioned hook forming the body of the support. Straps are provided for holding the sheet-like material in place on the support and pads are fixed to the Z-shaped member to prevent the support device from scratching the automobile.

4 Claims, 2 Drawing Figures

CARRIER FOR AUTOMOBILE

GENERAL STATEMENT OF INVENTION

A support is disclosed which is intended to carry sheet-like material of, for example 4 foot by 8 foot sheet on the side of an automobile.

OBJECTS OF THE INVENTION

It is an object of the invention to provide an improved support for carrying sheet-like material on an automobile.

Another object of the invention is to provide a support that is simple in construction, economical to manufacture and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
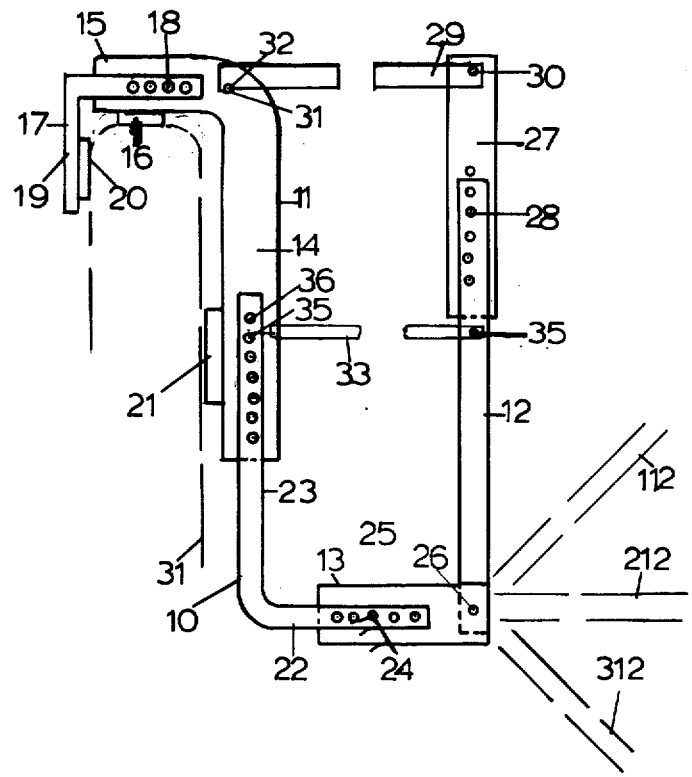
FIG. 1 is a front view of the support device according to the invention.
Figure 2:
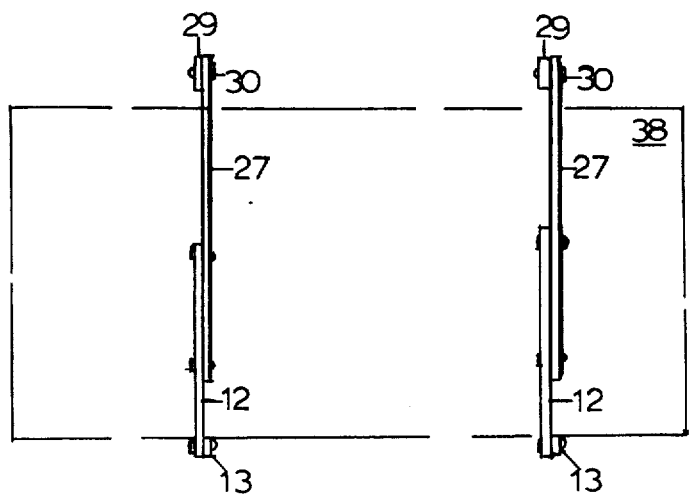
FIG. 2 is a side view of the support device according to the invention.

Now with more particular reference to the drawing, a carrier is indicated generally at 10, made up of a Z-shaped first side member 11 and a straight second side member 12, held in spaced relation to each other by an intermediate member 13. The Z-shaped member has a vertical part 14 and a horizontal part 15 disposed in the form of an L-shaped member and having a pad 16 on the underside of the horizontal part 15. An L-shaped member 17 is attached to the leg 15 by means of suitable fasteners in holes 18 by which the space between the leg 19 of the L-shaped member 17 and the vertical leg 14 can be adjusted. A pad 20 is supported on the inside of the leg 19 and a pad 21 is supported on the inside of the vertical leg 14 to further protect the finish of the automobile.

The L-shaped member 22, the vertical leg 23, can be adjustably attached to the leg 14 by suitable fasteners, for example a bolt and nut arrangement, and the height of the member 13 below the member 15 can thus be adjusted. The intermediate leg 13 is attached to the leg 24 by a suitable bolt in one of the holes 25. The leg 12 is pivoted to the intermediate leg 13 by means of a pivot 26 and the leg 12 is attached to the extension 27 by a suitable bolt in one of the holes 28. A strap 29 may be secured to the opening 30 by a suitable bolt or the like and a fastener 31 such as a hook or a snap can be supported in the eyebolt 32. A second strap 33 secured to the vertical member 12 by means of a bolt 34 and a suitable hook 35 can engage an eyebolt 36 for holding a load of lesser width.

In operation, the leg 11 will be supported along the outer side 37 of an automobile and the pad 16 rests on the bottom side of the window, while the leg 19 will extend into the car and downward on the inside thereof and the pad 20 will rest against the inner surface of the door. The width of the space between legs 14 and 19 can be adjusted by means of the bolt in hole 18. The space between the legs 12 and 14 can be adjusted by means of bolt 24 in the holes 25 to provide a suitable space for the sheet-like material 38. The leg 12 can then be swung downward to one of the positions 112, 212, or 312, to facilitate loading of the sheets. When the sheet has been loaded, the leg 12 will be swung up to vertical position and held in that position by either the strap 29 or the strap 33.

The foregoing specification sets forth the invention in its preferred forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A carrier for an automobile comprising, a generally z-shaped first side member and a second side member, means supporting said second side member on said first side member providing a generally U-shaped space therebetween, said first side member having an intermediate member and a first end member and a second end member, said first end member being fixed to said intermediate member at the upper end thereof and extending therefrom generally perpendicular thereto, said second end member being fixed to said intermediate member at the end thereof opposite said first end member and extending therefrom in a direction opposite said first end member, said second side member being supported on the end of said second end member at the end thereof remote from said intermediate member, the upper end of said second side member having means securing it to said first side member, said second side member being pivotally supported on said second end of said second end member, said second end member comprising an intermediate member fixed to said second end member providing adjusting means for adjusting the space between said second side member and said first side member, said first side member comprising means for adjusting the length of said first side member, said first side member comprising a first L-shaped member, said first L-shaped member having one leg that is adapted to extend downwardly inside the door of an automobile, a second leg of said first L-shaped member being adapted to overlie the upper edge of said door, said second end member comprising a second L-shaped member, said second L-shaped member having a first leg adjustably secured to said intermediate leg of said Z-shaped member, a second leg extending perpendicular to said intermediate leg of said L-shaped member, and said second L-shaped member having spaced holes therein adapted to receive a fastening means for adjustably securing said L-shaped member to said intermediate leg of said first side member and to means for adjusting the width of the space between said first side member and said second side member.

2. The carrier recited in claim 1 wherein said second side member comprises an upper part and a lower part, said lower part being pivoted to said intermediate member and said upper part being adjustably secured to said lower part whereby the length of said second side member can be changed.

3. The carrier recited in claim 2 wherein said means securing the upper end of said second side member to said first side member comprises a strap fixed to said second side member and having releasable means secured to said first side member.

4. The carrier recited in claim 3 wherein a second strap means is secured to said lower part of said second side member and having snap means thereon adapted to be secured to said first side member.

* * * * *